United States Patent
Gramowski et al.

(10) Patent No.: US 7,894,739 B2
(45) Date of Patent: Feb. 22, 2011

(54) TANDEM FINISHING

(75) Inventors: Jeffrey Gramowski, North Chili, NY (US); Richard J. Milillo, Fairport, NY (US); Nicholas W. Czebiniak, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 399 days.

(21) Appl. No.: 12/142,247

(22) Filed: Jun. 19, 2008

(65) Prior Publication Data
US 2009/0317119 A1 Dec. 24, 2009

(51) Int. Cl.
*G03G 15/00* (2006.01)
(52) U.S. Cl. ............... 399/82; 399/361; 399/381; 399/390; 399/407
(58) Field of Classification Search ............ 399/82, 399/361, 381, 390, 407
See application file for complete search history.

(56) References Cited

U.S. PATENT DOCUMENTS

| | | | |
|---|---|---|---|
| 2005/0121847 A1* | 6/2005 | Anzai et al. | 270/58.08 |
| 2005/0185222 A1* | 8/2005 | Sammis et al. | 358/2.1 |
| 2007/0035080 A1* | 2/2007 | Yamada et al. | 399/407 |
| 2007/0127058 A1* | 6/2007 | Eldridge | 358/1.15 |

* cited by examiner

*Primary Examiner*—Ryan D Walsh
(74) *Attorney, Agent, or Firm*—Fay Sharpe LLP

(57) ABSTRACT

Systems and methods are described that facilitate permitting a high-speed marking system or printer to run at maximum speed without being impeded by a relatively slow, low-speed finisher. A plurality of low-speed finishers are coupled to the high-speed marking system in a tandem, and optionally parallel-tandem, arrangement, where the number of finishers is equal to or greater than the ration of the maximum operating speed of the marking system to individual finisher maximum operating speed. In this manner, a low-cost solution is provided to overcome bottleneck problems associated with low-speed finishers.

16 Claims, 3 Drawing Sheets

TANDEM FINISHING

BACKGROUND

The subject application relates to finishers in a printing system. While the systems and methods described herein relate to providing finisher resources to meet high-speed marking system demands, it will be appreciated that the described techniques may find application in other printing systems, other xerographic applications, and/or other finishing systems.

A conventional approach to increasing printing throughput is to increase the speed of the printer. However, increasing printer speed typically results in greater stress on the individual components of the printer. Another approach is to employ several marking engines, which can be vertically and/or horizontally stacked, within a printing platform. Multiple marking engine systems provide relatively higher overall output by parallel printing processes, wherein portions of the same document are printed on multiple printers or concurrently processing multiple print jobs. For example, an electronic print job that includes color and monochrome portions may be partitioned and distributed across color and monochrome printers. Print media substrate (e.g., paper, velum, plastic . . . ) is fed from a common or different source to the printers. Printed substrate is conveyed to a finisher where the media associated with a single print job are assembled. Such systems are commonly referred to as "tandem engine" printers, "parallel" printers, or "cluster printing" printers.

As the speeds of the marking system increase, it is desirable that the finishing device(s) keep pace with the marking system. It is becoming increasingly difficult for the finishing device(s) to match marking system speed while providing a large number of features. Existing high speed finishers tend to be limited in their capabilities and/or become very expensive in order to meet marking system speed requirements.

Accordingly, there is an unmet need for systems and/or methods that facilitate overcoming the aforementioned deficiencies.

BRIEF DESCRIPTION

In accordance with various aspects described herein, systems and methods are described that facilitate maximizing output from a high-speed marking system using a plurality of low-speed finishers arranged in tandem. For example, a method of employing low-speed finishers to finish pages output from a high-speed marking system comprises receiving print job information describing one or more print jobs to be executed, planning and scheduling the one or more print jobs, determining a number of low-speed finishers to be employed to finish printed pages output by the marking system, and interleaving pages as they are output from the high-speed marking system to at least two low-speed finishers arranged in a tandem configuration.

According to another feature described herein, a tandem finishing system comprises a high-speed marking system that executes one or more print jobs comprising one or more pages or sets of pages, and at least two low-speed finishers arranged in a tandem configuration to receive interleaved pages as they are output from the marking system.

Yet another feature relates to an apparatus for employing low-speed finishers to finish pages output from a high-speed marking system, the apparatus comprising means for receiving print job information describing one or more print jobs to be executed, means for planning and scheduling the one or more print jobs, means for determining a number of low-speed finishers to be employed to finish printed pages output by the marking system, and means for interleaving pages as they are output from the high-speed marking system to at least two low-speed finishers arranged in a tandem configuration.

DETAILED DESCRIPTION

Figure 1:
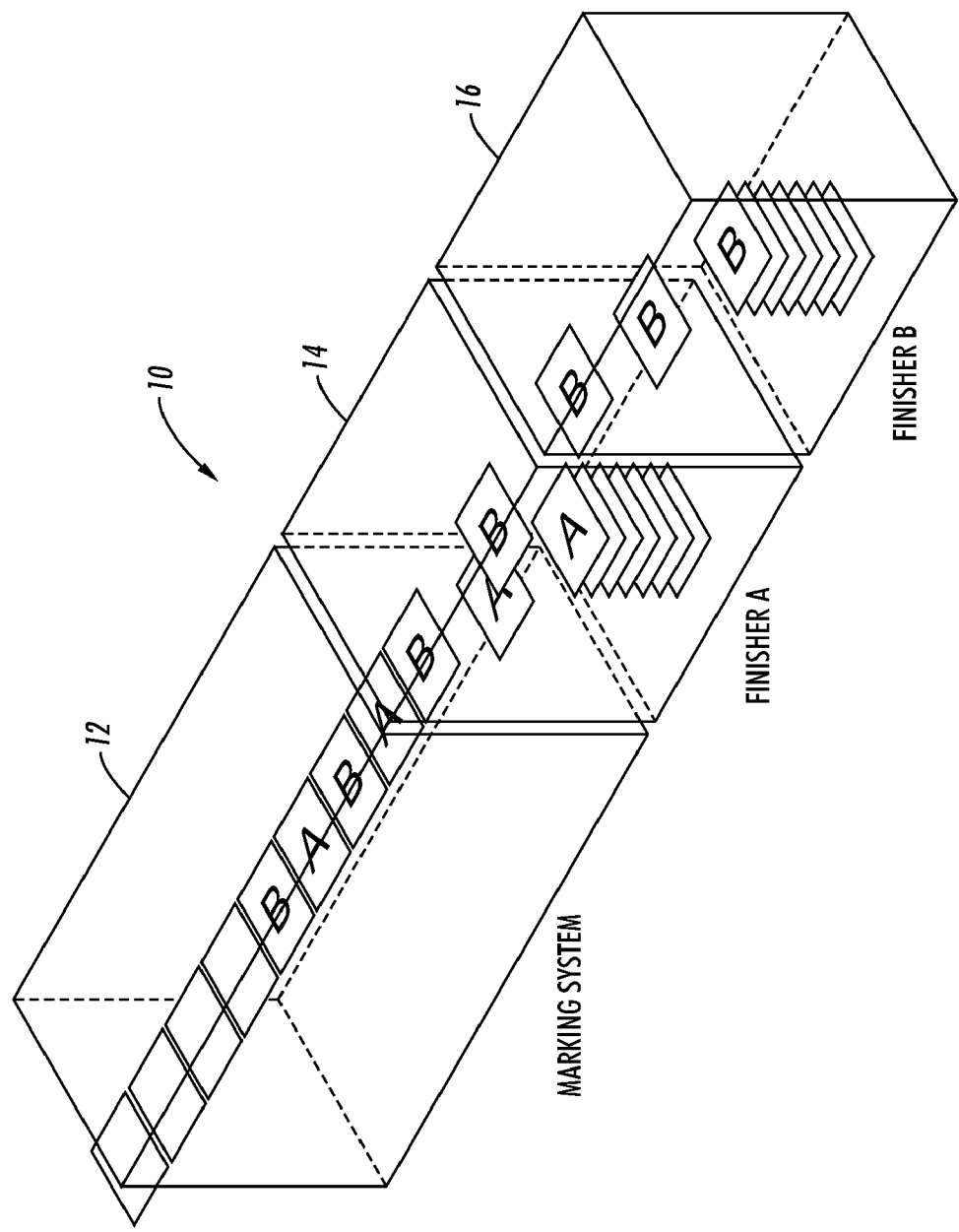
FIG. 1 illustrates a tandem finishing system that facilitates meeting marking system speed requirements using low-speed finishers.

In accordance with various features described herein, systems and methods are described that allow multiple finishers to be run to concurrently distribute a page load across all the finishers, allowing the finishers to run at slower speeds than the marking system. With reference to FIG. 1, a tandem finishing system 10 is illustrated that facilitates meeting marking system 12 speed requirements using low-speed finishers 14, 16. According to an example, each successive sheet is sent to a different finisher until all the finishers have been used, at which point the process starts over from the first finisher. The system 10 intelligently decides what to print based on job composition and user preferences. For example, if every sheet of a print job is the same, or if sheet order is not important, then the system can print as previously described. Alternatively, if several identical sets of different sheets are printed, or if set order is not important, then the system 10 interleaves N number of sets of sheets, where N is also the number of finishers used. Interleaving is performed in such a way that all the sheets for a particular set are sent to the same finisher. If the set order is specified, then the system 10 interleaves jobs such that all sheets or sets of sheets in a particular job go to one finisher, allowing the system 10 to print N jobs at the same time. This technique permits slow-cut sheet finishers to be attached to high speed web printers, allowing the mixing of high speed web printing with cut-sheet work flows, etc.

According to the figure, the marking system 12 alternates printing sheets for the first finisher 14 and the second finisher 16. This configuration enables the marking system 12 to run at twice the rate of the finishers 14, 16. The system can employ different modes of printing depending on the type of job being run.

According to one example, if every page of the job is the same, or if sheet order is not important, then odd pages can be directed to finisher$_A$ 14 and even pages can be directed to finisher$_B$ 16, or vice versa.

According to another example, if every set of sheets or pages in a job is the same, then system can print two sets simultaneously, alternating sheets between the two different sets. For instance, a three sheet set can be printed as follows, with the marking system 12 routing sheets to respective finishers:

Set 1 Page 1→Finisher A
Set 2 Page 1→Finisher B
Set 1 Page 2→Finisher A
Set 2 Page 2→Finisher B
Set 1 Page 3→Finisher A
Set 2 Page 3→Finisher B
Set 3 Page 1→Finisher A
Set 4 Page 1→Finisher B
... etc.

Sets that are not identical can be printed in a similar manner when set order is not a concern.

When sheet order and set order are specified, then the system 10 can print two different jobs in parallel. For instance, the marking system 12 routes pages or sheets as follows:

Job 1 Set 1 Page 1→Finisher A
Job 2 Set 1 Page 1→Finisher B
Job 1 Set 1 Page 2→Finisher A
Job 2 Set 1 Page 2→Finisher B
Job 1 Set 1 Page 3→Finisher A
Job 2 Set 1 Page 3→Finisher B
Job 1 Set 2 Page 1→Finisher A
Job 2 Set 1 Page 4→Finisher B
... etc.

Figure 2:
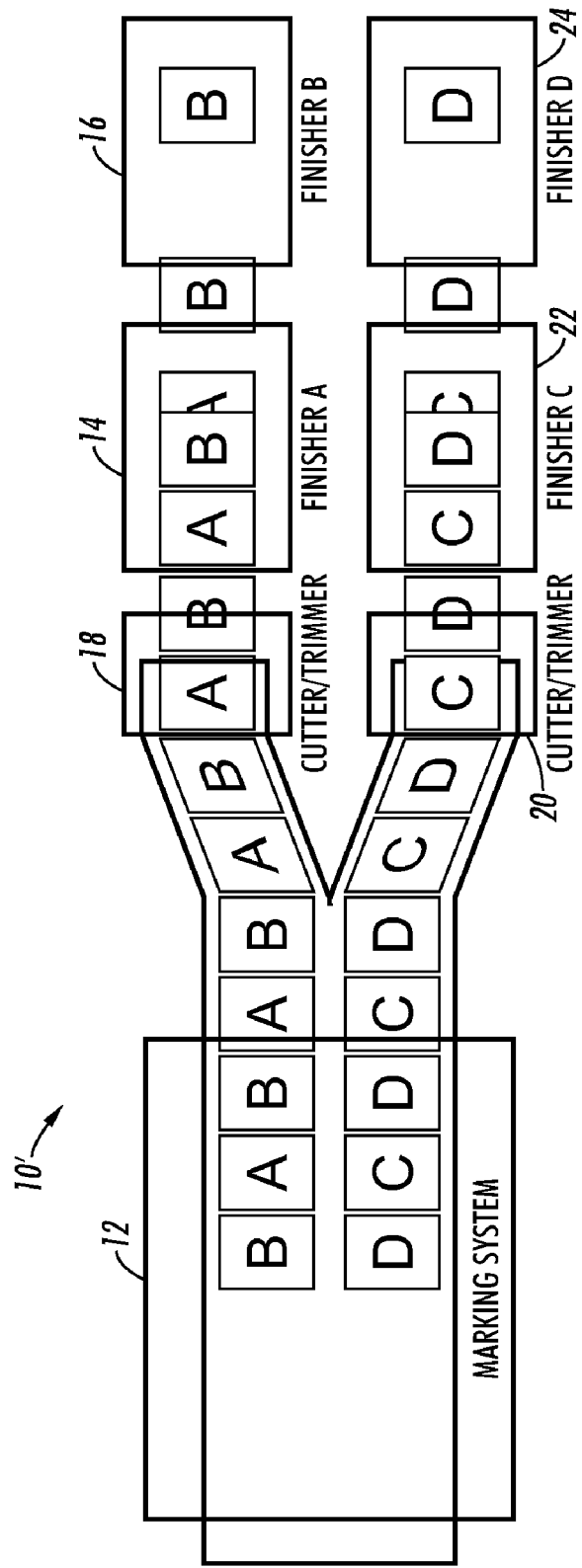
FIG. 2 illustrates a tandem finishing system in which four finishers are employed in a parallel tandem configuration.

FIG. 2 illustrates a tandem finishing system 10' in which four finishers are employed in a parallel tandem configuration. The system 10' includes the marking system 12 or printer, which is coupled to a pair of sheet cutters 18, 20, or trimmers. Sheet cutter 18 trims sheets from jobs A and B as they come from the marking system 12, before they are passed on to finishers 14 and 16. Sheet cutter 20 trims sheets from jobs C and D as they come from the marking system 12, before they are passed on to finishers 22 and 24. In this embodiment, the marking system 12 operates at up to twice the speed of the respective sheet cutters and up to four times the speed of the respective finishers.

The configuration allows the marking system 12, which may be a high-speed continuous feed marking system, to be connected to slower-speed cut sheet finishers 18, 20, thereby allowing a cut sheet workflow to be added to the end of a continuous feed system. The system 10' can employ the same or similar modes of operation as the two-finisher tandem system of FIG. 1, but with double the capacity.

According to another embodiment, multiple jobs can be tracked by the marking system 12 to facilitate paper jam recovery. In yet another embodiment, the system 10' does not include the sheet cutters, and the marking system 12 operates at approximately four times the speed of the respective finishers.

It will be appreciated that any number of finishers, cutters (e.g., when the marking system is a continuous feed system), etc. may be employed to provide a scalable configuration of tandem and/or parallel finishers and/or cutters that mitigates the occurrence of a bottleneck at the finisher(s) and permits the marking system to operate at full speed, in accordance with the various aspects and/or embodiments described herein.

Figure 3:
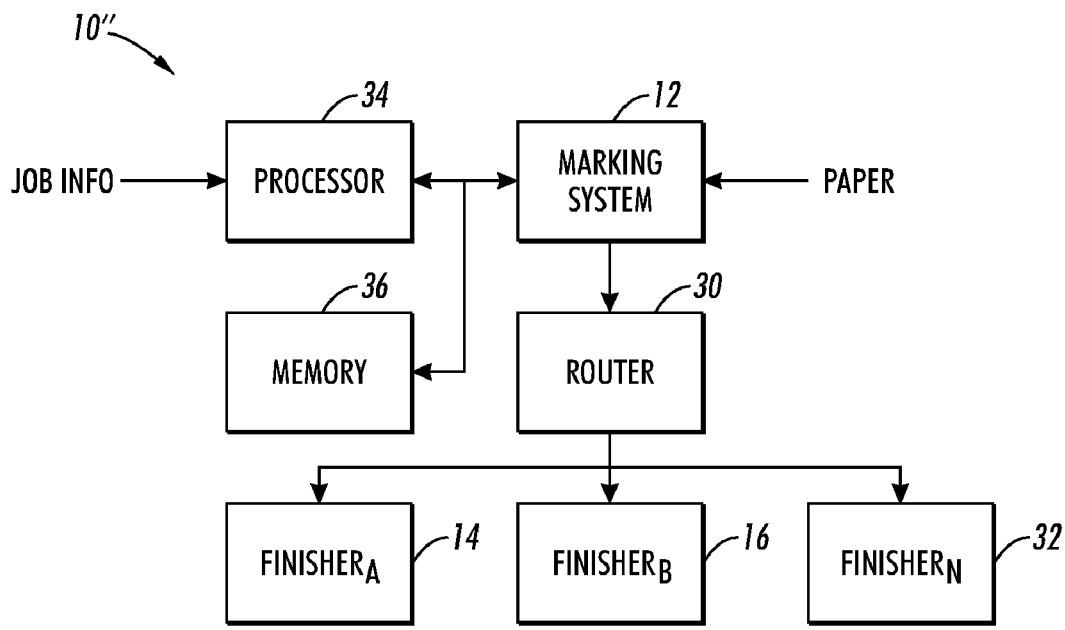
FIG. 3 illustrates a system that facilitates employing N low-cost finishers, or groups of tandem low-cost finishers, each having a maximum speed that is less than a maximum speed of a marking system employed to print pages.

FIG. 3 illustrates a system 10" that facilitates employing N low-cost finishers, or groups of tandem low-cost finishers, each having a maximum speed that is less than a maximum speed of a marking system employed to print pages. According to one embodiment, the number N of finishers employed is equal to or greater than the ratio of the maximum speed of the marking system to the maximum speed of each finisher.

For example, if the maximum marking system speed is less than or equal to twice the maximum speed of the finishers, then two finishers may be employed in a tandem or parallel configuration to permit the marking system to run at maximum speed without being impeded by the slower finisher speed. If the if the maximum marking system speed is less than or equal to three times the maximum speed of the finishers, then three finishers may be employed in a tandem and/or parallel configuration to permit the marking system to run at maximum speed, and so on.

Accordingly, the system 10" includes a marking system 12 that prints pages for one or more print jobs, and an optional router 30, which may be integral to the marking system 12, that routes pages associated with respective print jobs to respective finishers, so that each of a plurality of pages or sets of pages is routed to a specific finisher. The system further comprises a first finisher, finisher$_A$ 14, a second finisher, finisher$_B$ 16, through an Nth finisher, finisher$_N$ 32. In one embodiment, N is equal to the number of print jobs to be concurrently executed by the marking system.

The system 10" additionally comprises a processor 34 that executes, and a memory 36 that stores, machine-executable instructions for carrying out the various actions described herein. The processor receives job information related to one or more print jobs to be executed by the system, and performs planning and scheduling tasks for the marking system. Additionally, the memory 36 stores, and the processor 34 executes, instructions for tracking pages within and across print jobs, so that in the event of a paper jam in the marking system 12 or anywhere else in the system 10", all print jobs can be resumed after resolution of the paper jam.

Figure 4:
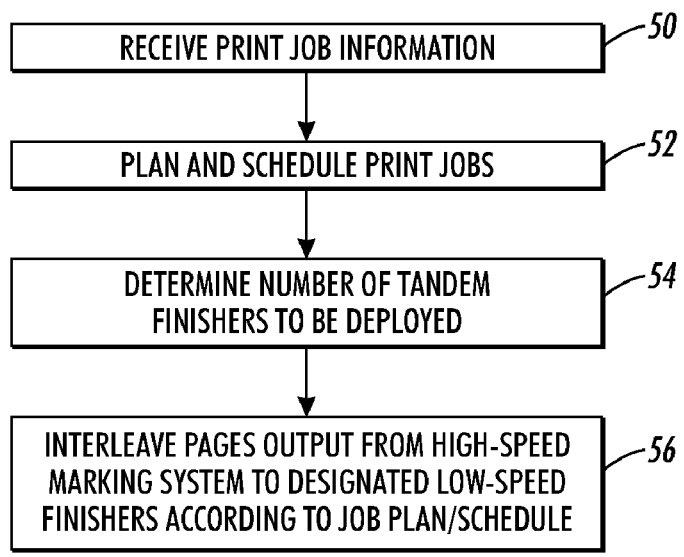
FIG. 4 illustrates a method related to employing multiple low-speed, low-cost finishers in tandem and/or parallel to enable a high-speed marking system to operate at maximum speed without being hindered by the slower-speed finishers, in accordance with various features.

FIG. 4 illustrates a method related to employing multiple low-speed, low-cost finishers in tandem and/or parallel to enable a high-speed marking system to operate at maximum speed without being hindered by the slower-speed finishers, in accordance with various features. While the methods are described as a series of acts, it will be understood that not all acts may be required to achieve the described goals and/or outcomes, and that some acts may, in accordance with certain aspects, be performed in an order different that the specific orders described.

At 50, job information describing one or more print jobs is received. The job information may include, without being limited to, job composition information (e.g., number of pages, sets of pages, jobs, etc.), user preferences (e.g., set ordering, page ordering, job ordering, etc.). At 52, the print job(s) are planned and scheduled. At 54, a number of tandem finishers to be employed is determined as a function of the job composition(s) and user preferences. At 56, pages and/or sets of pages are interleaved as they exit a high-speed marking system to be routed to respective low-speed finishers. In one embodiment, a plurality of low-speed finishers (e.g., 2, 3, 4, 6, etc.) are coupled to the marking system in tandem and/or parallel tandem configurations. 2 or more of the plurality of finishers are identified at 54 for a given job, up to and including all of the plurality of finishers.

According to an example, if every page of the print job is the same, or if sheet order is not specified (e.g., by a user), then odd pages can be directed to a first finisher and even pages can be directed to a second finisher, or vice versa.

According to another example, if every set of sheets or pages in a job is the same, then N sets can be printed concurrently using N finishers, alternating sheets between the different sets, in a manner similar to that set forth in the dual-finisher example with regard to FIG. 1. Sets that are not identical can be printed in a similar manner when set order is not a concern.

When sheet order and set order are specified, then N different jobs can be printed in parallel using N finishers. For instance, a marking system routes pages or sheets in a manner prescribed by the ordering of sheets in each set, and the ordering of sets, etc.

In one embodiment, a continuous feed marking system employs the method, and pages are routed to one or more cutters or trimmers as they are output from the marking system. Each cutter then routes pages to two or more tandem finishers according to one or more of the routing algorithms described herein.

Finisher arrangements may be purely tandem (e.g., having two or more finishers in series), or a combination of tandem finisher sets arranged in parallel with each other, in accordance with the various aspects and/or embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of employing low-speed finishers to finish pages output from a high-speed marking system, comprising:
   receiving print job information describing one or more print jobs to be executed;
   planning and scheduling the one or more print jobs;
   determining a number of low-speed finishers to be employed to finish printed pages output by the marking system;
   interleaving pages as they are output from the high-speed marking system to at least two low-speed finishers arranged in a tandem configuration; and
   routing odd pages to a first finisher and even pages to a second finisher when all pages of a job are the same; wherein the print job information comprises job composition information and user preference information; wherein the job composition information comprises a number of jobs to be printed, a number of sets of pages in each job, and a number of pages in each set and wherein the user preference information comprises information related to page ordering, set ordering and job ordering.

2. The method of claim 1, further comprising routing odd pages to a first finisher and even pages to a second finisher when user preference information does not specify a page ordering.

3. The method of claim 1, further comprising routing N sets of pages to N finishers, where N is an integer greater than or equal to two, wherein each page in a given set is routed to a single finisher, when the job composition information indicates that all sets of pages are the same.

4. The method of claim 1, further comprising routing N jobs, each job comprising one or more pages, to N finishers, where N is an integer greater than or equal to two, when the user preference information specifies a page ordering and set ordering.

5. The method of claim 1, further comprising cutting pages as they are output from the marking system when the marking system is a continuous feed marking system.

6. The method of claim 1, further comprising dividing the maximum operational speed of the marking system by the maximum operational speed of one of the finishers to determine the number of finishers to be employed to finish the printed pages, where all of the finishers have a substantially similar maximum operational speed.

7. A tandem finishing system, comprising:
   a high-speed marking system that executes one or more print jobs comprising one or more pages or sets of pages; and
   at least two low-speed finishers arranged in a tandem configuration to receive interleaved pages as they are output from the marking system;
   wherein the high-speed marking system routes odd pages to a first finisher and even pages to a second finisher when all pages of a job are the same; further including print job information comprising: job composition information and user preference information; wherein the job composition information comprises a number of jobs to be printed, a number of sets of pages in each job, and a number of pages in each set and wherein the user preference information comprises information related to page ordering, set ordering and job ordering.

8. The system of claim 7, wherein the marking system is a continuous feed marking system.

9. The system of claim 8, further comprising a cutter that cuts pages for routing to respective finishers as they are output from the continuous feed marking system.

10. The system of claim 7, further comprising a processor that receives job composition information and user preference information, and generates a job plan and schedule for the one or more print jobs.

11. The system of claim 10, further comprising a memory that stores one or more of job composition information, user preference information, and job plans and/or schedules.

12. The system of claim 11, wherein the processor executes instructions stored in the memory for tracking pages as they are printed and finished to facilitate paper jam recovery.

13. The system of claim 7, wherein the at least two low-speed finishers comprise two sets of at least two tandem finishers, the sets are arranged in parallel with each other.

14. The system of claim 7, comprising N low-speed finishers, where N is an integer greater than or equal to 2, and is greater than or equal to the ratio of the maximum operational speed of the high-speed marking system to the maximum operational speed of one of the low-speed finishers.

15. An apparatus for employing low-speed finishers to finish pages output from a high-speed marking system, comprising:
   means for receiving print job information describing one or more print jobs to be executed;
   means for planning and scheduling the one or more print jobs;
   means for determining a number of low-speed finishers to be employed to finish printed pages output by the marking system;
   means for interleaving pages as they are output from the high-speed marking system to at least two low-speed finishers arranged in a tandem configuration; and
   means for routing odd pages to a first finisher and even pages to a second finisher when all pages of a job are the same.

16. The apparatus of claim 15, further comprising:
   means for cutting the pages as they are output from the high-speed marking system;
   wherein the high speed marking system is a continuous-feed marking system.

* * * * *